(12) United States Patent
Miller

(10) Patent No.: US 12,570,412 B2
(45) Date of Patent: Mar. 10, 2026

(54) DEPLOYABLE AERODYNAMIC DECELERATORS WITH A GAS BARRIER

(71) Applicant: Miller Scientific Inc., Flagstaff, AZ (US)

(72) Inventor: Stephen D. Miller, Flagstaff, AZ (US)

(73) Assignee: Sundance Management LLC, Sheridan, WY (US)

( * ) Notice: Subject to any disclaimer, the term of this patent is extended or adjusted under 35 U.S.C. 154(b) by 996 days.

(21) Appl. No.: 17/572,619

(22) Filed: Jan. 10, 2022

(65) Prior Publication Data

US 2023/0219700 A1     Jul. 13, 2023

(51) Int. Cl.
*F16L 59/02*     (2006.01)
*B64G 1/58*      (2006.01)

(52) U.S. Cl.
CPC .............. B64G 1/58 (2013.01); F16L 59/029 (2013.01)

(58) Field of Classification Search
None
See application file for complete search history.

(56) References Cited

U.S. PATENT DOCUMENTS 3,340,136 A * 9/1967 Burns .................... D04H 1/587
                                                528/307
6,616,866 B1 * 9/2003 Crompton .............. C09K 21/02
                                                524/492

2004/0058608 A1   3/2004  Heifetz
2013/0115837 A1   5/2013  Kitchen et al.
2014/0273701 A1   9/2014  Samanta et al.
2017/0225429 A1 * 8/2017  Yu ........................... B32B 5/024
2018/0084853 A1   3/2018  Markesbery et al.

FOREIGN PATENT DOCUMENTS

EP         1641895 B1      6/2009
EP         3198069 B1      3/2019
EP         3756884 A1 *   12/2020   ............ B32B 15/02
JP        2009120998 A  *  6/2009   ............ C03C 13/00
WO        WO-9401492 A1 *  1/1994   .............. C08K 3/22

* cited by examiner

*Primary Examiner* — Marla D McConnell
*Assistant Examiner* — Kevin Worrell
(74) *Attorney, Agent, or Firm* — Invention To Patent Services; Alex Hobson

(57)     ABSTRACT

A thermal protection systems of a deployable aerodynamic decelerators includes a high temperature flexible insulation that utilizes a Flexible Gas Barrier (FGB) configured on an outside layer of a Hypersonic Inflatable Aerodynamic Decelerator-Thermal Protective System (HIAD F-TPS). The high temperature flexible insulation includes high temperature fibers and frits that melt upon exposure to elevated temperatures to prevent advection through the thickness of the high temperature flexible insulation. A coating may also be configured on an outside surface of the high temperature flexible insulation to also prevent advection. The frits may be configured through the thickness with different melting temperatures.

15 Claims, 14 Drawing Sheets

Prior Art

FIG. 1

DEPLOYABLE AERODYNAMIC DECELERATORS WITH A GAS BARRIER

CROSS REFERENCE TO RELATED APPLICATIONS

This application claims the benefit of priority to U.S. provisional patent application No. 63/134,977, filed on Jan. 8, 2021, U.S. provisional patent application No. 63/134,975, filed on Jan. 8, 2021 and to U.S. provisional patent application No. 63/298,168 filed on Jan. 10, 2022; the entirety of all applications are hereby incorporated by reference herein.

BACKGROUND OF THE INVENTION

Field of the Invention

The invention relates to deployable aerodynamic decelerators for aerospace vehicles that enable and enhance robotic and scientific missions to locations with atmospheres such as Mars, Venus, Titan and Earth.

Background

NASA is developing deployable aerodynamic decelerators to enhance, and enable, robotic and scientific missions to destinations with atmospheres such as Mars, Venus, and Titan, as well as returning payloads to Earth from Low Earth Orbit (LEO). The benefit of deployable decelerators is that relatively large atmospheric entry vehicles can be designed to fit within a comparatively small vehicle launch fairing. Deployable decelerator technology will enable delivery of an estimated 20 metric tons of payload required to support human exploration of Mars, and will also enable return of large payloads from Low Earth Orbit as well as launch asset recovery for reduced cost of space access. For human exploration of Mars, it is estimated that a deployable decelerator may have a diameter of 18 meters which, for an inflatable system, will require over 100 cubic meters of hydrogen gas at a weight of nearly 700 kgs.

Inflatable, pressure-stabilized structures of these deployable decelerators are inherently comprised of thin membranes that can be readily folded and packaged into a small volume. The resulting structural wall, which must be protected from aerodynamic heating, is very thin and has little capacity to store heat. Therefore, a relatively thick layer of thermal insulation is required to limit the amount of heat reaching the structural wall so that its maximum temperature limit is not exceeded. This insulation must also be folded and packaged into a small volume before being deployed. Therefore, the insulation for this application should be not only low mass, but also thin, flexible and porous. In fact, a designer may have to trade some mass efficiency for an insulation that is thinner and can be packaged more compactly.

In the early 1960's, researchers recognized the advantages of using gas barriers[i] near the OML to prevent mass flow and entry of oxygen. The added weight and bulk of the gas barrier is compensated by reduced ablation, recession and heat transfer through the remainder of the Thermal Protective System (TPS). In their discussion, a gas impermeable layer forms on the outer skin of an ablator. They discuss both charring ablators and phase change ablators. In one example, quartz undergoes a phase change from solid to liquid, and again from liquid to gas, absorbing energy in each transition, and carrying more heat away as the gaseous silica is transported by the shearing action of the boundary layer. Not only does this layer absorb and transport heat as described above, it prevents mass flow into the rest of the TPS by creating a self-healing, molten liquid seal on the outside of the TPS.

SUMMARY OF THE INVENTION

The invention is directed to deployable aerodynamic decelerators for aerospace vehicles that enable and enhance robotic and scientific missions to locations with atmospheres such as Mars, Venus, Titan and Earth.

An exemplary thermal protection systems of a deployable aerodynamic decelerators comprises a Flexible Gas Barrier (FGB) configured on the hot side of the Hypersonic Inflatable Aerodynamic Decelerator-Thermal Protective System (HIAD F-TPS). As with other low density TPS materials, F-TPS materials are especially vulnerable to forced convection due to their porosity. LI-900, as used in shuttle tiles, was 94% void volume[ii] and used the RCG coating to help form a gas barrier. Similarly, the KFA-5 layers in the F-TPS are 96% void volume[iii] and the Pyrogel layer is 10% void volume[iv], suggesting uninterrupted pathways from the OML through the SiC fabric to the Kapton gas barrier. Adding an FGB at the OML would block mass flow and improve F-TPS performance.

The FGB would make the F-TPS more effective and improve its capability, which would improve down massing efficiency. The payload capacity of HIAD is limited mostly by the bulk of the F-TPS. If the F-TPS materials can be made more efficient, then the F-TPS can be made thinner. This would allow larger ballutes to be carried in the same canister for larger payloads or allow the current F-TPS to be used on re-entry trajectories with higher heating rates. Improving F-TPS performance would enable more challenging missions, which would reduce payload delivery costs.

While rigid TPS allow a viscous layer of molten ceramic to form on the OML to prevent mass flow, the ideal location for the FGB in the F-TPS is between the two layers of SiC fabric that comprise the outer covering of the F-TPS. The SiC cloth layers won't sublimate at the temperatures anticipated during HIAD re-entry so they forma potential containment system for the gas barrier. The FGB will be designed to melt and seal the gaps in the SiC fabric weave to reduce mass transfer. Alumina and quartz were selected for these attributes by previous researchers[v].

The FGB is envisioned as a wet laid nonwoven consisting of a materials designed to melt and seal the F-TPS before it reaches conditions where mass flow could be deleterious. A silica material would be chosen that melts and flows under those conditions, and that material would be used to form the wet laid nonwoven. To facilitate flow and wetting of the gas barrier material within the SiC fabric sandwich, it may be necessary to avoid organic binders in the nonwoven, and to include wetting agents. Such materials are described in the literature by people skilled at joining SiC and $SiO_2$ through brazing. Proper viscosity will allow the gas barrier to fill in the crevices but not migrate through the outermost SiC layer to be carried away by the shearing action of the flow. The goal would be to develop the gas barrier material with the proper melt, flow, wetting and viscosity characteristics to achieve an effective seal before the onset of deleterious mass flow, and maintain that seal for the remainder of the re-entry.

A recent study included sizing thermal protection systems for three different Martian decelerator configurations included calculations for a Hypersonic Inflatable Aerodynamic Decelerator (HIAD). Details are provided in the Detailed Description with reference to the figures.

Ruggedized Opacified Fibrous Insulation (ROFI) are being developed and evaluated for HIAD. An exemplary ROFI utilizes silicon carbide whiskers as opacifiers and those opacifiers enhance the performance of ROFI such that a significant reduction in thickness is anticipated.

A high temperature flexible insulation material may be configured to substantially reduce the amount of radiation transmitted therethrough by incorporating a reflective mat of high temperature fibers that withstand temperatures of at least 500° C., or for higher temperature applications, at least 1,000° C. or higher. The radiation may be attenuated through the thickness of the deployable high temperature flexible insulation, or through individual layers of insulation mats thereof. The insulation mat may have optical properties to produce a transmittance of no more than 5% over a range of temperature from 500° C. to 5000° C. The mat may include high temperature fibers such as carbon and/or silicon carbide, among others, and these fibers may be coupled by a binder in a non-woven fabric. These binders, may be nano-fiber binders. The flexible insulation material may be configured in a deployable aerodynamic decelerator or a Hypersonic Inflatable Aerodynamic Decelerator (HIAD) and may be durably flexible.

An exemplary insulation mat may include carbon fibers designed and manufactured for their ability to attenuate infrared radiation peaking at a specific temperature or range of temperatures. The insulation mat may have optical properties optimized to to have substantially reduce transmittance and may reflect radiation, absorb the radiation and/or absorb and reflect and re-emit the radiation. The radiation may be scattered to prevent it from passing through the high temperature flexible insulation material. By these methods, and by adjusting the volume fraction of fibers per unit volume, the extinction coefficient of the insulation mat may be optimized for a specific application.

An insulation mat of an exemplary deployable high temperature flexible insulation comprises a structural component, an extinction coefficient and a binder component that are integrated together to provide high temperature resistance with durability and flexibility. The insulation mat may be folded and packed down and retained for very long periods of time in outer space, where the temperature may be less than −250° C. Upon entry back into the atmosphere, the deployable high temperature flexible insulation may be deployed, wherein the folded insulation mat is unfolded to deflect or shield an object or components of a space craft from high heat.

The structural component may be any of alumina, carbon, silica, mullite, a carbide, a nitride, a boride, and combinations thereof. An exemplary structural component may include high temperature fibers, such as alumina fibers that have a length of about 15 mm or more, about 25 mm or more, about 50 mm or more, about 100 mm or more and any range between and including the length values provided. The average diameter may be less than about 1 μm, about 1 μm or more, about 3 μm or more, about 5 μm or more and any range between and including the diameter values provided. It is important that the structural component have a length that enables effective entanglement. The longer the length, the more durable the insulation mat may be, especially for folding and deploying from a folded or packed configuration.

In a more commercial application of this invention, the structural component would be a natural fiber like wool. Typical wool fibers are 25 μm in diameter, and would be shortened to 25 mm or less to facilitate production of the invention.

The extinction component may be designed to optimize performance over a specific range of wavelengths corresponding to a specific heat pulse encountered during use. Factors like emittance, diameter and index of refraction, are considered when designing and manufacturing the fibers or particles to be used as the extinction component. The density of those fibers or particles in a given volume will determine the number of interactions between wavelengths of radiation and the extinction components, and is therefore a crucial design factor in optimizing the extinction component.

The extinction component may be selected to provide factors like emittance, fiber diameter and index of refraction, emittance that is optimized for the expected or calculated temperature that the insulation mat will be exposed to. The specific density, fibers or particles per volume, of the extinction component may be important to filter our infrared radiation through the thickness of the insulation mat. As described herein the type of extinction material, and the size and density may be change through the thickness of the deployable high temperature flexible insulation. An outside layer of the deployable high temperature flexible insulation may include a smaller sized extinction component than an insulation mat forming an inside layer. The extinction component may be any of alumina, carbon, silica, mullite, a carbide, a nitride, a boride, and combinations thereof and may have a diameter from less than about 1 μm, about 1 μm or more, about 3 μm or more, about 5 μm or more and any range between and including the diameter values provided. Again, the change in diameter from an outside layer to an inside layer may be about 20% or more, about 50% or more about 100% or more and any range between and including the percentages provided. The extinction component may be SiC, for example that may have a diameter of less than 1 μm, such as about 0.5 μm to 1 μm on average. A deployable high temperature flexible insulation designed for a short heat pulse may have bigger fiber diameter differential of the extinction component from the outside layer to the inside layer as the heat gradient through the insulation material may be greater than when a longer heat pulse is required. When there is a long exposure to a high temperature, the temperature proximal to or within the inside layer may approach that of the temperature of the outside layer. Additionally, the heat capacitance of the extinction component can be optimized with respect to the total heat load.

An exemplary binder component is configured to further bind together the structural and extinction components and may include a cellulous material, such as rayon, Polyvinyl acrylate (PAN), colloidal alumina and/or colloidal silica and/or polypropylene fibers. An exemplary binder is a fibrous binder component, and preferably a nano-fibrous component, such as polyacrylonitrile (PAN) nano-fibers having an average diameter that is less than 1 micron meter and of a length to diameter ratio of about five or more, about 10 or more, about 20 or more, about 50 or more, 100 or more and any range between and including the ratios provided. A longer fibrous binder may more effectively become entangled with the structural component and extinction component and produce a more durable and/or flexible insulation mat. Additionally, a non-fibrous binder may be included, such as an acrylic or silicone binder, such as Polyseamseal available from Loctite, (Hartford, CT), a low viscosity, water soluble adhesive that is flexible when cured. This non-fibrous binder may be added to the insulation mat in a weight concentration of about 3% to 5%, about 10% or more, about 20% or more, or even or up to 30% by weight and any range between and including the values provided.

The binder may be a material that does not melt, but rather decomposes when exposed to very high heats, such as polyacrylonitrile (PAN), that ablates when exposed to high temperatures. This ablation process is endothermic and therefore reduces the heat or temperature within the insulation mat and which enables the insulation mat to be subjected to a longer and/or higher temperature heat exposure. The nano-fibrous binder may be PAN or cellulous fibers from Engineered Fibers Technology, Rockford, IL (images shown on www.eftifibers.com/Prod_EFTecNano.

The ratio of components may be selected to provide effective heat insulation, flexibility and durability. For example, as described herein the amount of binder included in the insulation mat may be surprising high, such as at least 10% or more by weight, at least 15% or more by weight, at least 20% or more by weight, about 25% by weight or more, about 30% or more by weight or from about 10% to about 30% by weight and any other range between and including the percentages provided. This high weight percent of binder provides effective durability and flexibility but also provides heat dissipation as it ablated or absorbs heat during decomposition. The structural component may be included in a weight percent of the insulation mat of about 25% or more, about 30% or more, about 40% or more, about 50% or more, from about 25% to about 60% and any other range between and including the values provided. A minimum amount of the structural component may be required for structural durability during exposure to high temperatures after being deployed. As the binder decomposes, the structural component has to be effective to maintain the structure of the insulation mat. The extinction component may be included in a weight ratio of the insulation mat of about 25% or more, about 30% or more, about 40% or more, about 50% or more, from about 25% to about 60% and any other range between and including the values provided. The structural component and the extinction component may be different materials having different compositions and/or diameters and lengths.

The binder and/or the high temperature fibers used as structural components or extinction components may be produced through electrospinning. Electrospinning may be used to produce the high temperature fibers, such SiC whisker that are about 10 mm or longer, about 20 mm or longer, about 25 mm or longer, such that they may provide effective structural support and also provided emissivity properties. Electrospinning may enable the structural and extinction components to be the same material.

For lower temperature embodiments alternative materials may be used that are not as temperature resistant, such as natural fibers, including wool, that may bound together by a fibrous binder, such as cellulose or PAN, and other non-fibrous binders such as a silicone, for example, Loctite PolySeamSeal, IDH number 1510049, a water-based silicone sealant. This lower temperature embodiment may also include silica aerogel, alumina aerogel, aluminosilicate aerogel, fumed silica or micro-balloons that is bound into the insulation mat and may be bound between layers of insulation mats by the binder, fibrous or non-fibrous.

Other material may be included in the insulation mat including aerogel. Aerogels, fumed silica, micro-balloons and other additives can be included to reduce solid gas conduction and gas thermal conductivity. While these are unimportant in a vacuum, insulations used in a gaseous atmosphere require consideration of these heat transfer mechanisms. The additives are optimized by two means; first, the molecular mean free path can be minimized, which means that the gas molecules have little room for movement whereby they can transfer heat to surrounding surfaces, and second, by choosing materials with minimal heat capacitance such that heat cannot be readily transferred from gas molecules to the surrounding surfaces if they are already at the same temperature. Microspheres, aerogels, fumed silica and fumed alumina are four examples of materials that could be chosen for these properties. The pore sizes of these additives can be as small as $10^{-7}$m, which is small enough to prevent gas movement. Including these additives can reduce the pore size from $10^{-4}$m, which is typical of fibrous insulations, to $10^{-6}$m, which is not uncommon for fiber reinforced aerogels. Using fumed silica, fumed alumina or microspheres could be expected to yield a pore size of $10^{-5}$m, which demonstrates a substantial improvement over fibrous materials alone without the added cost of aerogels. Because the densities of these additives are low, the heat capacitance is also low, so both requirements of the additives are satisfied when the goal is to reduce solid gas conduction and gas thermal conductivity. While these materials don't typically provide structure or radiation attenuation features, it is possible to choose a material, such as carbon aerogel, which offers several desirable features in a single material Another additive that may be included in the insulation mat includes a foaming agent, such as pentaerythritol and melamine phosphate that forms a foam with exposed to high temperatures. Carbonaceous foams offer numerous advantages as an insulation additive when the insulation needs to resist high temperatures over 500C for short periods of time. Carbon has a high emissivity, which means that carbon effectively blocks radiative heat transfer, and also efficiently re-emits any absorbed heat back towards its source. With a specific heat of approximately 0.72 J/g° C., the heat capacitance of carbon is not extraordinary but the density is less than half of that of silicon carbide such that the resulting heat capacitance of carbon is substantially less than that of other materials used to block radiation. The result is that less heat is retained by the carbon, and is instead re-emitted toward the source as the insulation reaches thermal equilibrium with it's surroundings. Furthermore, as the carbon degrades it absorbs heat in an endothermic ablation process, which has the further benefit of reducing the through-thickness heat flux in single use applications. When additives are used that result in a carbon foam being created on the insulation surface, the foam can also release a gas which reduces the rate of degradation by blocking interaction with oxygen molecules and thereby reducing oxidation rates. Since some additives create the carbon foam in response to heat, a rapidly expanding, self-healing layer of endothermic flame resistant coating can be maintained on the surface of the insulation for a predetermined period of time.

For some applications it is necessary to reinforce the insulation mat so that it can withstand fabrication, packing, storage and deployment. This can be accomplished by the addition of a scrim. Depending on the timing of the mechanical stresses, it may or may not be necessary that the scrim withstand extremely high temperatures. In one example, scrim was added to an insulation layer to increase the tensile strength from approximately 4 lbf, which was not acceptable, to at least 12 lbf, which was acceptable. Other materials in the Flexible Thermal Protection System of the HIAD have tensile strengths between 12 and 52 lbf as measured by ASTM 5034-95 (2007). The scrim used in this case was a fiberglass scrim (Style 3004) produced by Textum Inc. (Belmont, NC). In some cases, the scrim was bonded between layers of insulation, and in others it was attached to the surface of the insulation Thermal degradation, as used herein, means there is appreciable mass loss (at least 10% or more) when heated in a non-oxygenated environment or that the materials melts and changes the state of matter from solid to liquid.

An average size of a high temperature fiber or of an extinction component, such as a fiber or particle, is the average diameter of the fibers or the average particle size of the particles, which may be a powder.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIG. 1 shows cross sectional diagram of a Prior Art Hypersonic Inflatable Aerodynamic Decelerator (HIAD) Thermal Protective System (TPS).

Figure 2:
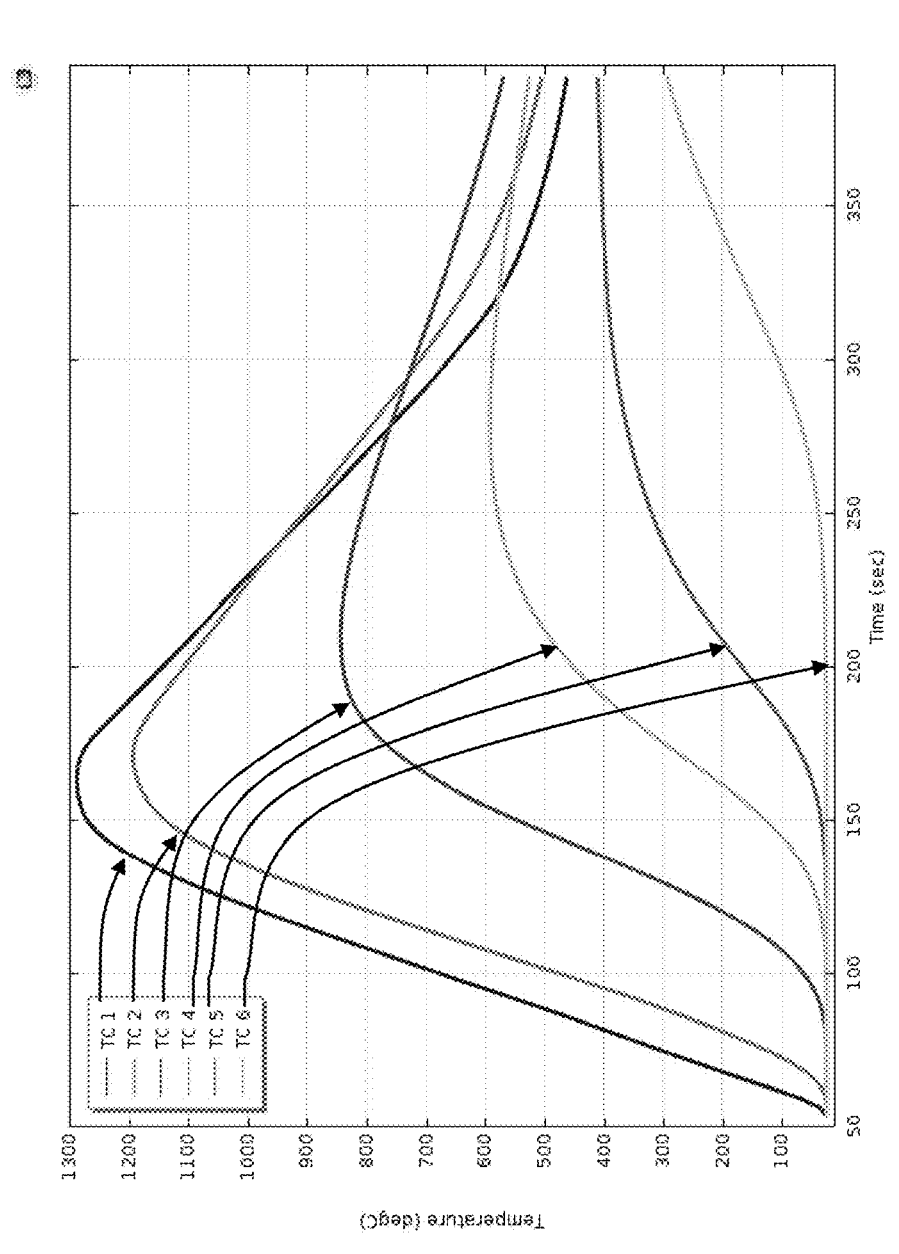
FIG. 2 shows a graph of Calculated HIAD TPS temperature for an aerocapture trajectory.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
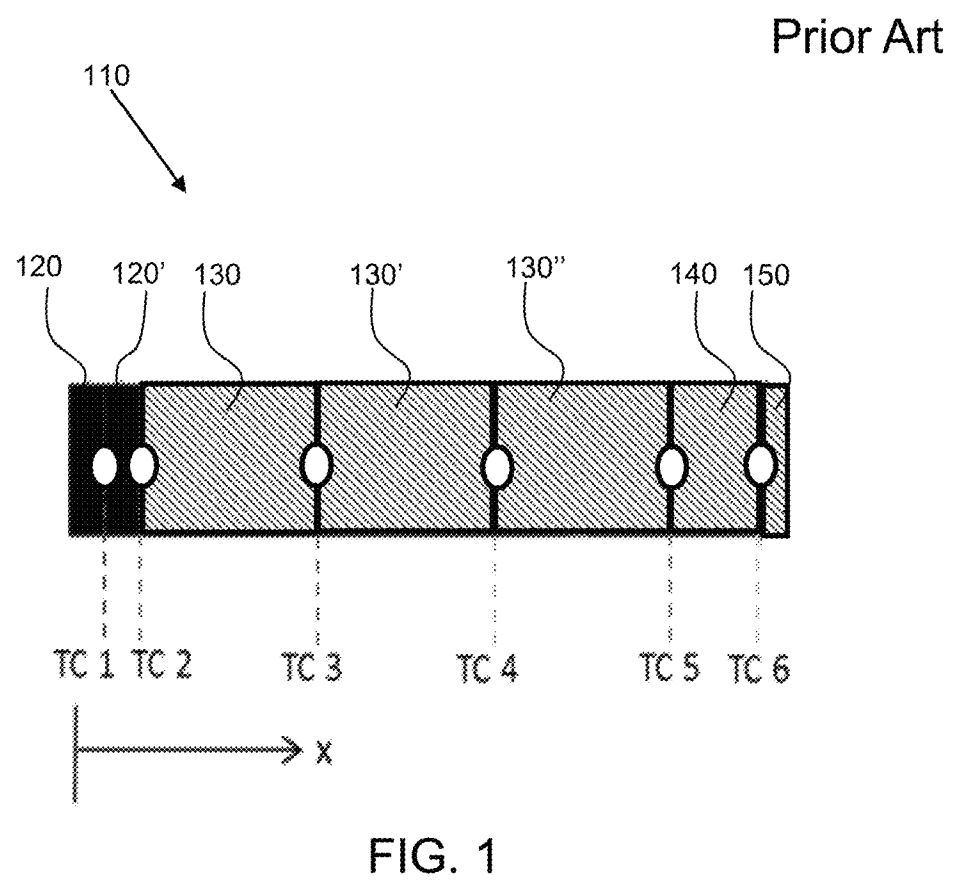

A recent study included sizing thermal protection systems for three different Martian decelerator configurations included calculations for a Hypersonic Inflatable Aerodynamic Decelerator (HIAD). A sketch of the thermal model of the HIAD wall configuration is shown in FIG. 1. The wall consists of two outer layers of silicon carbide fabric 120, 120', three layers of a 5 mm thick carbon felt insulation layer 130, 130', 130", a layer of fiber reinforced silica aerogel insulation 140 (Pyrogel 2250) and a Kapton gas barrier on the inner surface 150. Temperatures for the thermocouple locations (TC1 to TC6) indicated in FIG. 4 were calculated for both an aerocapture trajectory and an entry trajectory. The calculated temperature histories for an aerocapture trajectory are shown below in FIG. 2. The insulating layers reach peak temperatures between 300° C. and 1200° C. The ambient gas pressure, which affects insulation thermal conductivity, will vary from vacuum to the Martian surface atmospheric pressure for entry trajectories and from vacuum to somewhat less than surface atmospheric pressure for an aerocapture trajectory.

Figures 3, 4:
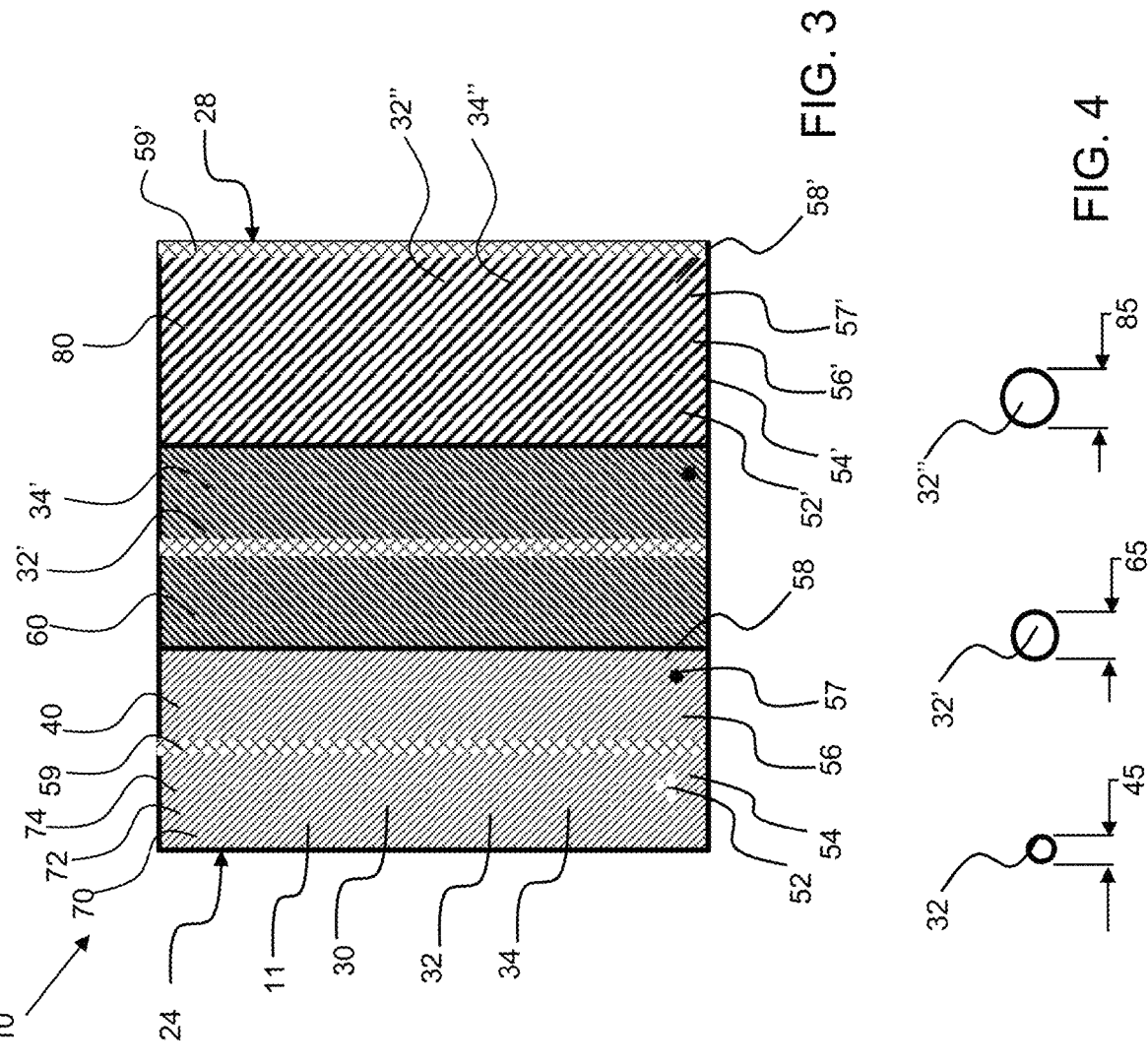
FIG. 3 shows cross sectional diagram of an exemplary Hypersonic Inflatable Aerodynamic Decelerator (HIAD) Thermal Protective System (TPS), or shows a cross-sectional view of an exemplary high temperature flexible insulation material, that has an outside layer, an intermediate layer and an interior layer, each comprising an insulation mat of high temperature fibers along with frits.
FIG. 4 shows the fiber diameters of the high temperature fibers in each of the insulation mat layers.

An exemplary thermal protection systems of a deployable aerodynamic decelerator 10 comprises a Flexible Gas Barrier (FGB) 11 configured on the hot side or outside surface 24 of the Hypersonic Inflatable Aerodynamic Decelerator- Thermal Protective System (HIAD F-TPS). As with other low density TPS materials, F-TPS materials are especially vulnerable to forced convection due to their porosity. LI-900, as used in shuttle tiles, was 94% void volume and used the RCG coating to help form a gas barrier. Similarly, the KFA-5 layers in the F-TPS are 96% void volume[vii] and the Pyrogel layer is 10% void volume[v] ", suggesting uninterrupted pathways from the OML through the SiC fabric to the Kapton gas barrier. Adding an FGB at the OML would block mass flow and improve F-TPS performance. Referring now to FIGS. 3 and 4, an exemplary high temperature flexible insulation 10, has an outside layer 40 configured on an outside surface 24, an interior layer 80 configured on an inside surface 28 and an intermediate layer 60 configured between the outside layer and inside layer. Each layer is an insulation mat 30 of high temperature fibers that are bound together by a binder, such as a fibrous binder. The outside layer 40 has high temperature fibers 32 and may include a fibrous binder 34, the inside layer 80 has high temperature fibers 32" and may also employ a fibrous binder 34" and the intermediate layer 60 has high temperature fibers 32' and again, may employ fibrous binder 34'. The diameter of the fibers may increase from the outside surface to the inside surface. The diameter 45 of the fibers 32 in the outside layer 40 are smaller than the diameter 65 of the fibers 32' of the intermediate layer 60 and the intermediate fibers are smaller than the diameter 85 of the fibers 32" of the inside layer 80.

The outside layer includes frits 70 that comprise mineral 72 and fluxes 74, as described herein. The minerals of the frits may be silica with some impurities, fluxes, that make them melt at different temperatures. The frits and associated mineral and fluxes may also be included in the intermediate and inside layer. The frits may be configured through the thickness of the high temperature flexible insulation with decreasing melting temperatures from the outside surface 24 to the inside surface, such that the frits may all melt at about the same time.

One or more of the layers of insulation mat may include additives 50 as described herein, including but not limited to, aerogel 52, foaming agent 54, a coating 56 such as vermiculite, fumed silica 57, and micro-balloons 58. As shown, these additives are in the outside layer 40 and may also be in one or more of the other layers, the intermediate layer 60 and/or the inside layer 80. As shown, the inside layer may also have additives, including but not limited to, aerogel 52', foaming agent 54', a coating 56' such as vermiculite, fumed silica 57', and micro-balloons 58', and the concentration of any of these additives may be different from the concentration in the outside layer. A scrim 59, 59' may be coupled with one or more of the layers of insulation. As shown, a scrim 59 is configured in the outside layer 40 and also the intermediate layer 60, wherein the insulation mate is configured on opposing sides of the scrim. Also, a scrim 59' is coupled to the inside layer 80, wherein the scrim is coupled to the inside surface 28 of the insulation mat 30. A vermiculite coating may be used as an adhesive to bond the scrim to an insulation layer.

Figure 11:
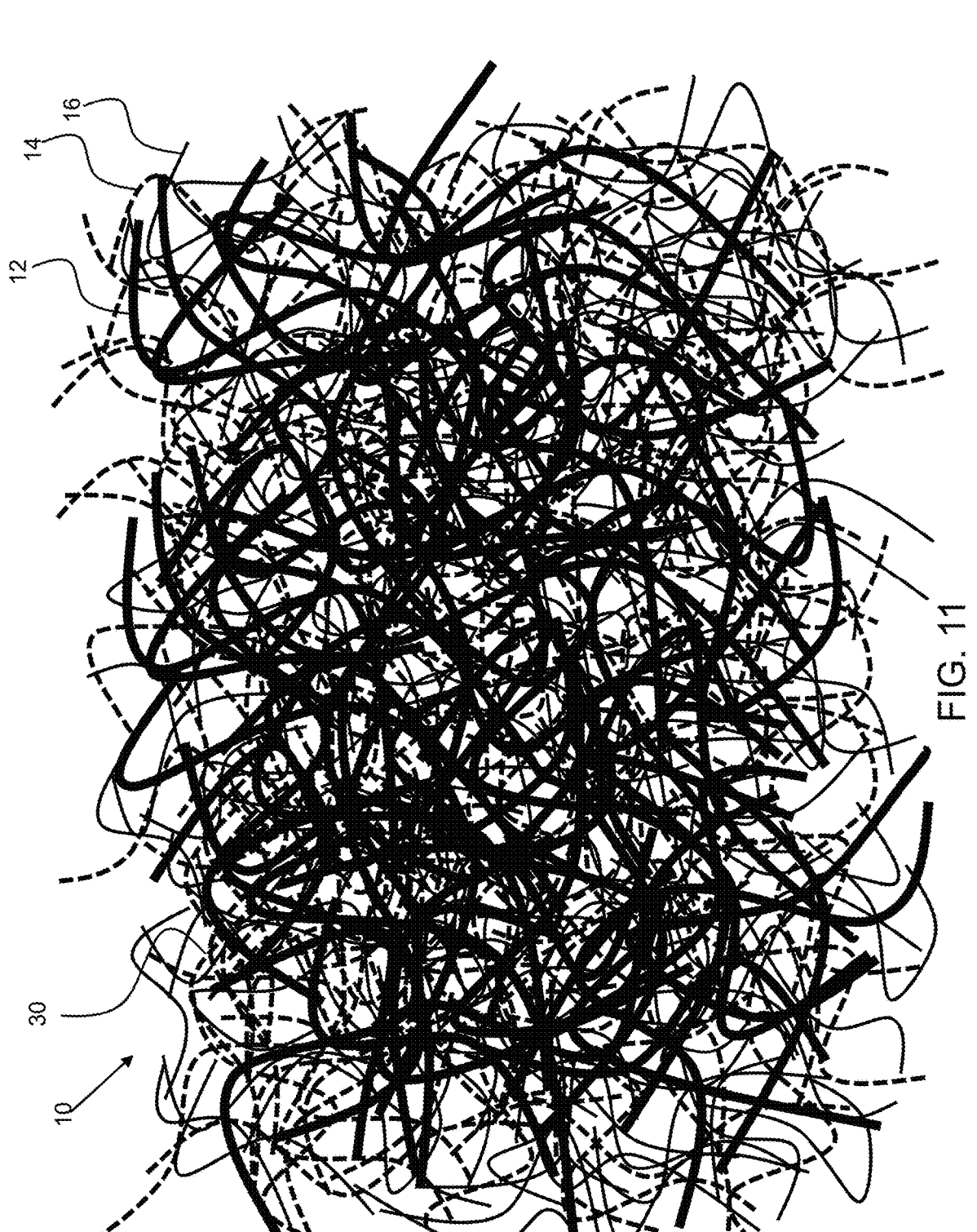
FIG. 11 shows a diagram of an exemplary deployable high temperature insulation comprising an insulation mat composed of a structural component, an extinction component and a binder component.

As shown in FIG. 11, an insulation mat 30 of an exemplary deployable high temperature flexible insulation 10 comprises a structural component 12, an extinction component 14 and a binder component 16 that are integrated together to provide high temperature resistance with durability and flexibility. The insulation mat may be folded and packed down and retained for very long periods of time in outer space, where the temperature is less than −250° C. Upon entry back into the atmosphere, the deployable high temperature flexible insulation 10 may be deployed, wherein the folded insulation mat is unfolded to deflect or shield an object or components of a space craft from high heat.

As described herein the structural component may be any of alumina, silica, mullite, a carbide, a nitride, a boride, and combinations thereof. An exemplary structural component may include high temperature fibers, as described herein including alumina fibers that have a length of about 15 mm or more, about 25 mm or more, about 50 mm or more, about 100 mm or more and any range between and including the length values provided. The average diameter may be less than about 1 μm, about 1 μm or more, about 3 μm or more, about 5 μm or more and any range between and including the diameter values provided. It is important that the structural component have a length that enables effective entanglement.

Figure 5:
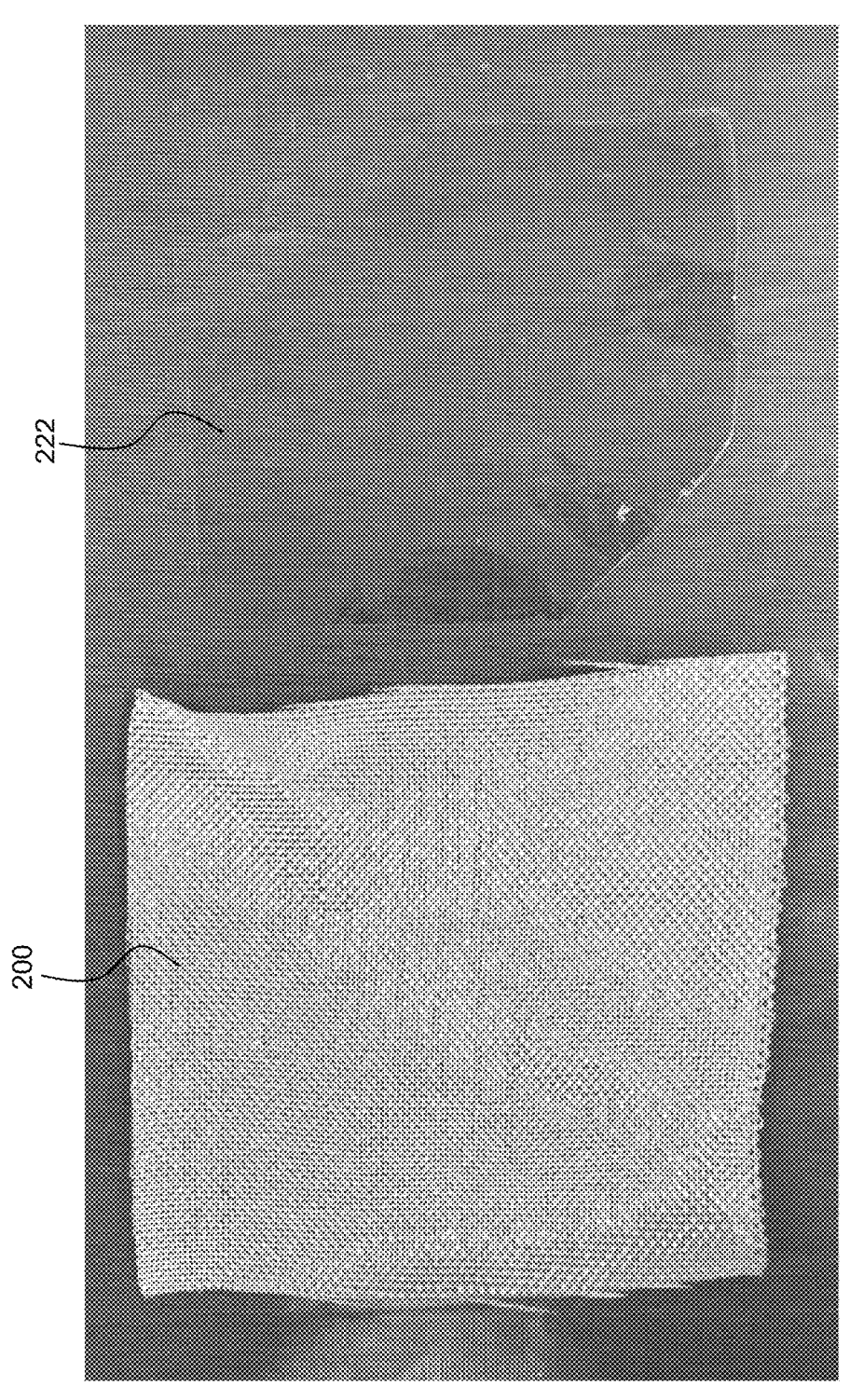
FIG. 5 shows a picture of sample components of a deployable aerodynamic decelerators including Nextel 312 and mica.
Figure 6:
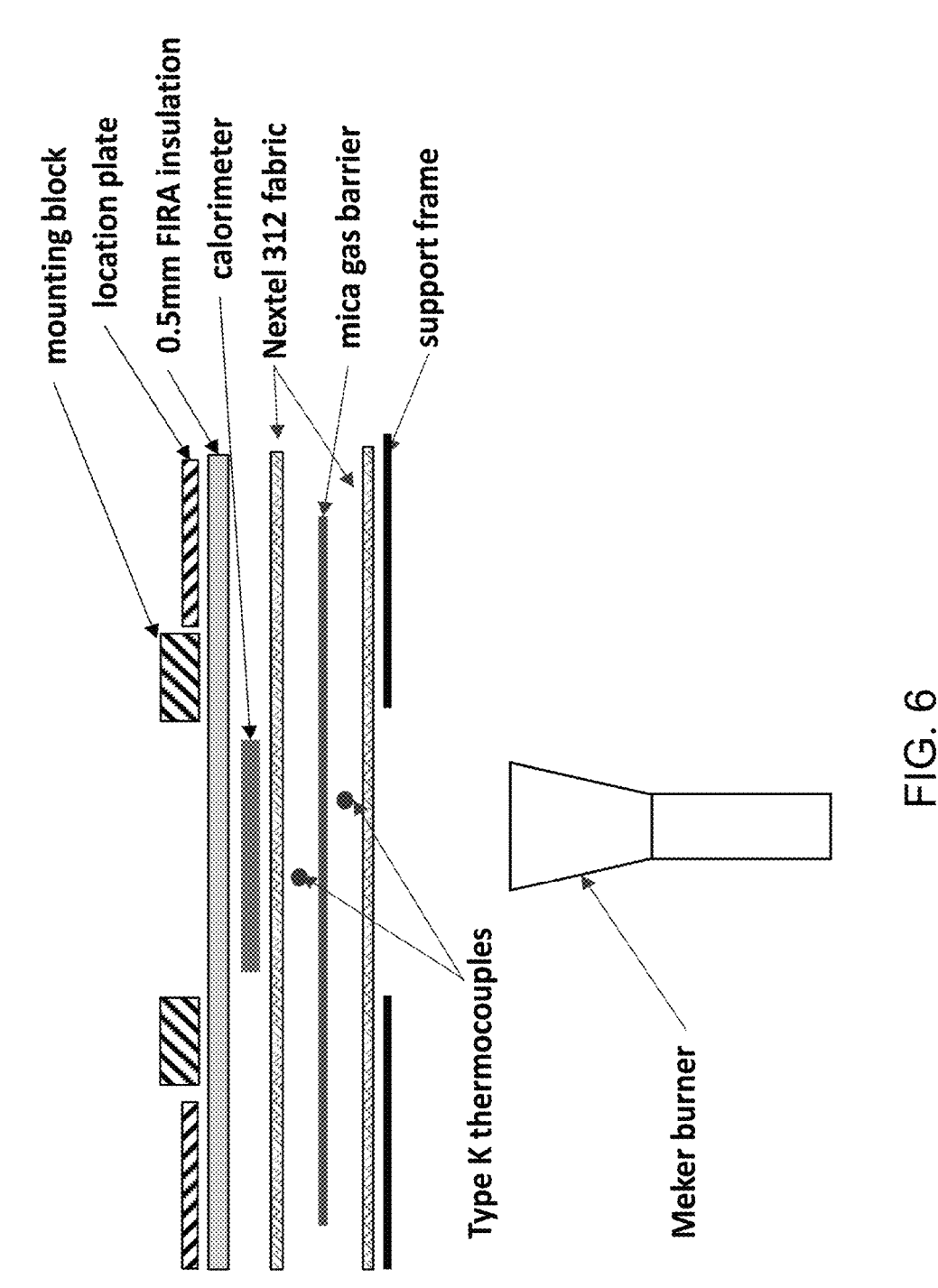
FIG. 6 shows an exploded side view of a sample in test set-up, N.T.S.

Concept Validation To be certain of the merits of this concept, an attempt was made to determine the significance of adding a gas barrier near the OML of an F-TPS. The objective was to determine if adding a gas barrier would create a measurable reduction in heat flux through the F-TPS. Without access to an arc jet test facility, the method of testing included using a Meker burner to impose a consistent heat load on one side of the sample and a calorimeter on the other side to measure the heat flux. The ThermIC test set-up, shown in FIG. 6, and DAQ system were repurposed for this test since the configuration has been proven previously. Because the HIAD F-TPS uses 2 layers of fabric, a 2-layer system was used for these samples. SiC fabric could not be located, so 3M Nextel 312 fabric was used instead. Two tests were conducted. In the first test, two layers of 6×6 in. Nextel 312 fabric 200 and mica 222 (as shown in FIG. 5) were placed on the specimen support frame with two thermocouples located between the two layers of fabric and in the central area of the 2×2 in. area that is exposed to flame during the exposure. The copper disk calorimeter was located in the center of the test area and on top of the sample. One layer of 0.5 mm, 6×6 in. FIRA insulation was placed on top of the calorimeter and extended to the edges of the sample. The calorimeter location plate and the calorimeter mounting block were placed on top of the FIRA to hold the components in place during the test. The alignment of the burner and sample were checked. In the second test, everything was the same except a 0.0005 in. thick layer of natural mica (FIG. 4b) was placed between the Nextel fabric layers, to act as a gas barrier, and the two thermocouples were located on opposite sides of the mica but still between the two layers of Nextel, as shown in FIG. 6. It was believed that the hot side conditions would be the same in both tests, and any differences in the heat flux measured in the calorimeter would be attributable to the presence of the gas barrier.

Figure 7:
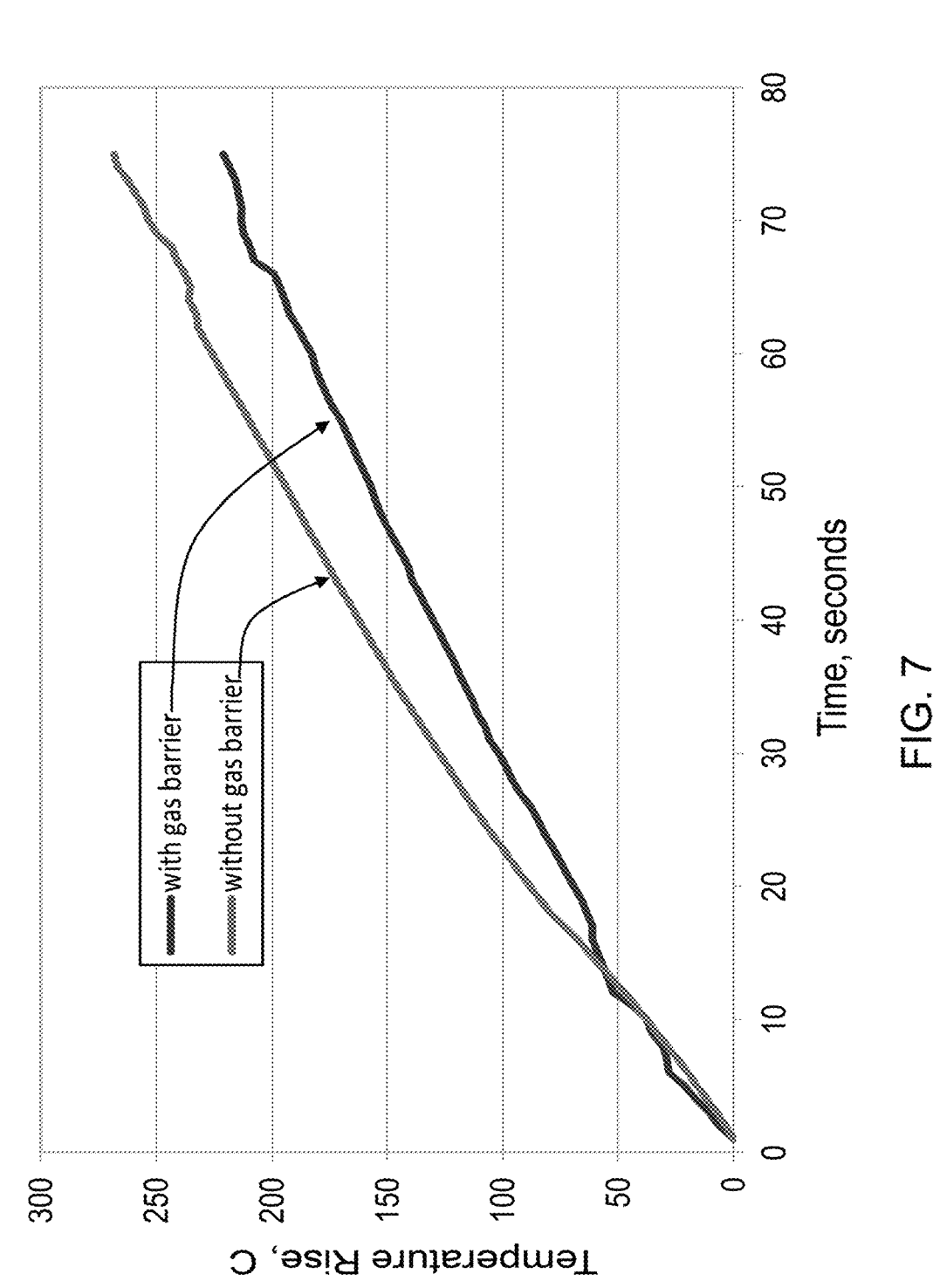
FIG. 7 shows a graph of calorimeter temperature rise with and without gas barrier between fabric layers.

The test procedure was followed, and the data were analyzed to determine if the gas barrier reduced heat flow. The DAQ system was started and the Meker burner was ignited. After 30 seconds to allow the burner to achieve a steady flame, the burner was slid into position to begin the exposure. Data was gathered for at least 90 seconds. As shown in FIG. 7, the calorimeter heated more slowly in the sample with the gas barrier. The heat flux was calculated for each test, and a 20% reduction in heat flux is attributed to the gas barrier, as calculated in Table 1.

TABLE 1

| Key test data and heat flux calculation with and without gas barrier | | | | | | | |
|---|---|---|---|---|---|---|---|
| | Run Data | | | CALORIMETER | | | HEAT |
| | T @ 20 Seconds | T @ 60 Seconds | dT/dt deg C./s | area cm2 | mass grams | Cp J/g.K | FLUX W/cm^2 |
| with gas barrier | 69.2 | 182.8 | 2.8 | 12.53 | 17.55 | 0.397 | 1.58 |
| without gas barrier | 88.1 | 226.0 | 3.4 | 12.53 | 17.55 | 0.397 | 1.92 |

The data also help us understand how the gas barrier works. A portion of the heat flux reduction is due to the thermal resistance of the mica. With a thickness of 0.0005 in. (0.0127 mm) and a thermal conductivity of 0.711 W/m-K, the temperature difference predicted across the gas barrier was less than $0.3°$ C. based on the heat flux of 1.58 $W/cm^2$ as calculated previously. However, the measured temperature difference can be seen in FIG. 7 and is approximately $50°$ C. A $50°$ C. temperature difference across the mica would actually correspond to a heat flux of 280 $W/cm^2$. Data and calculations for both the predicted and observed cases are given in Table 2, below. Clearly the benefit of the gas barrier is greater than thermal resistance of the material alone.

TABLE 1

| Predicted vs. observed dT and heat flux | | | | | | | |
|---|---|---|---|---|---|---|---|
| | Run Data | | | MICA | | | HEAT |
| | $T_{hot}$ ° C. | $T_{cold}$ ° C. | dT ° C. | area cm2 | thickness m | k W/m-K | FLUX $W/cm^2$ |
| PREDICTED | 625.0 | 624.7 | 0.3 | 1.00 | $1.27 \times 10^{-5}$ | 0.711 | 1.68 |
| OBSERVED | 625.0 | 575.0 | 50.0 | 1.00 | $1.27 \times 10^{-5}$ | 0.711 | 280 |

Figure 8:
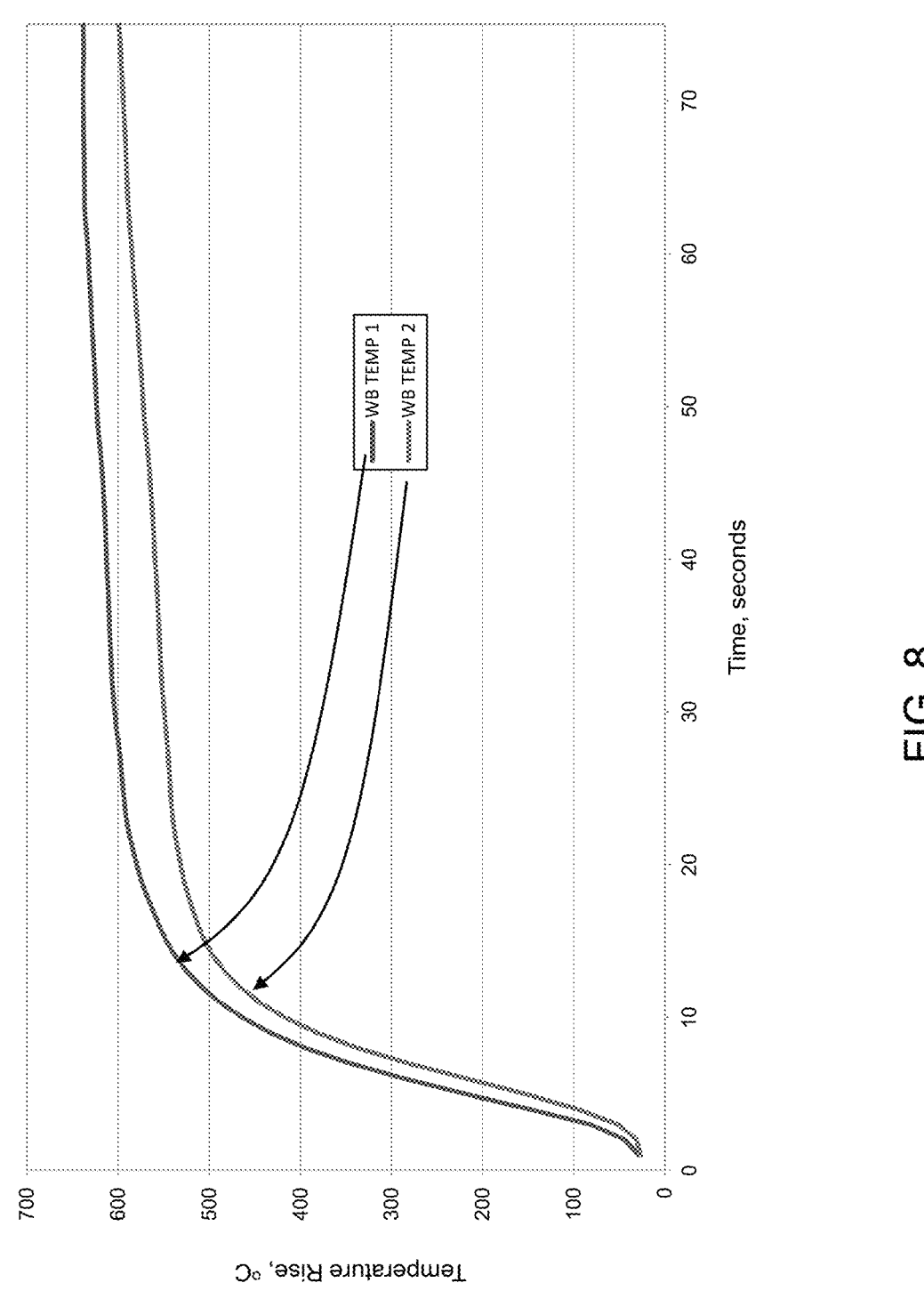
FIG. 8 shows a graph of temperature rise on either side of gas barrier.
Figure 9:
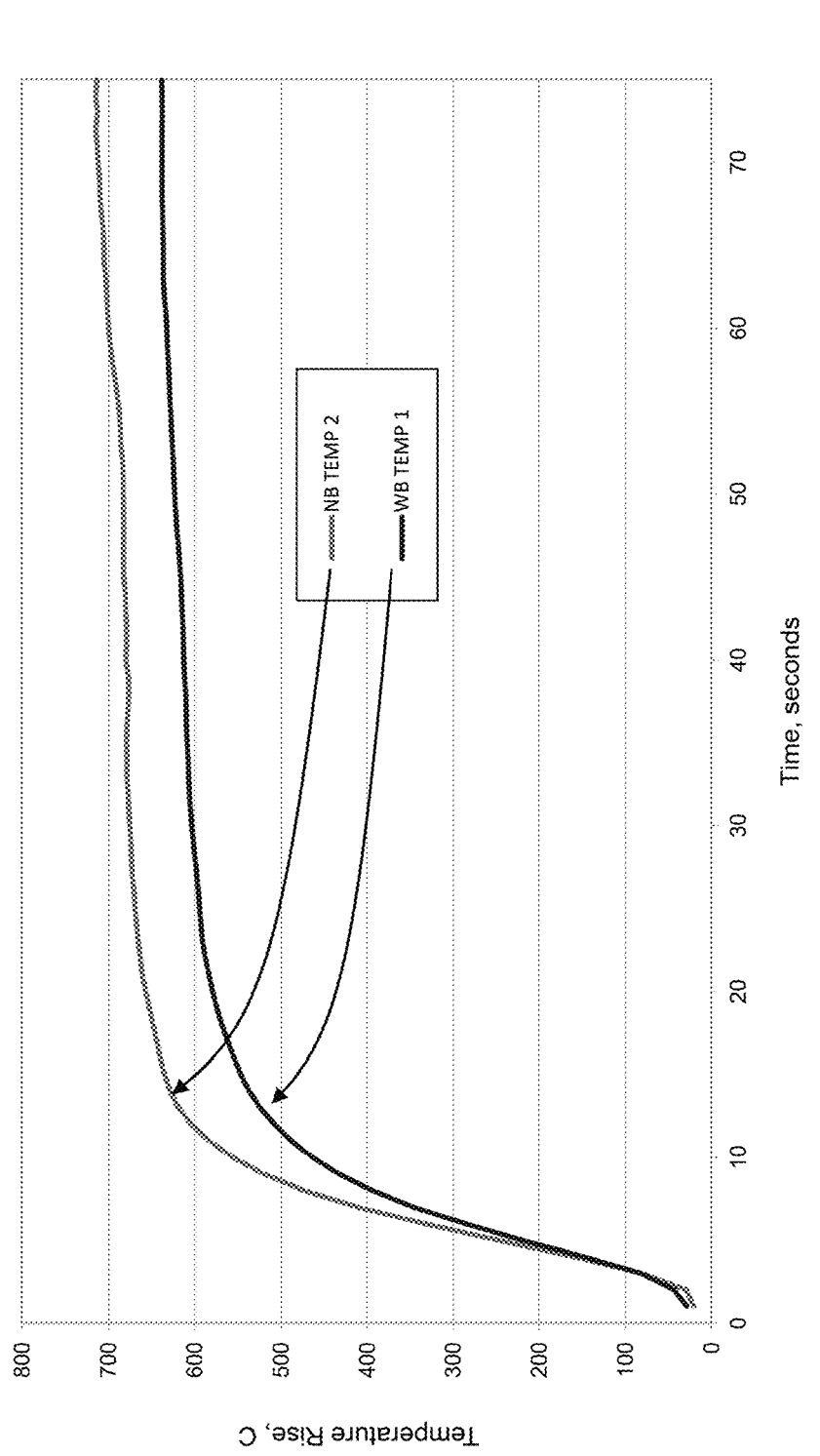
FIG. 9 shows a graph of a comparison of Nextel temperatures in samples with and without gas barrier.

Comparing the effect of the gas barrier on the hot side temperature is also interesting. The temperature just inside the first layer of Nextel fabric was expected to be comparable for runs with and without the gas barrier. The Meker burner is very consistent, the spacing between the burner and the sample was checked before each run, and the two runs were completed within 40 minutes of each other. The run-to-run consistency of the Meker burner allows it to be used to compare different materials. However, the temperature just inside the first layer of Nextel was substantially cooler in the run with the gas barrier. This can be seen in FIG. 8, which shows that the temperature just inside the first layer of Nextel on the sample with the gas barrier is typically $75°$ C. cooler than the same location on the sample with no gas barrier. It is hypothesized that the gas barrier creates a stagnant gas zone that prevents heated gasses from entering the sample and resulting in a lower temperature inside the first layer of fabric.

These two tests do indicate that an OML gas barrier would significantly reduce heat flux through the F-TPS but they are not conclusive. For example, there may have been an error in the experiment. It could be that the burner output was inconsistent in the consecutive runs, or that the thermocouples shifted giving readings that should not be compared. Furthermore, the SiC fabric may be less porous than the Nextel fabric, which would reduce the benefit of the gas barrier. Additionally, re-entry conditions cannot be realistically simulated with a Meker burner. Therefore, to know conclusively if an OML gas barrier would make the F-TPS more efficient, tests should be done with the real HIAD F-TPS at an arc jet test facility, and the results should be modeled including both heat and mass flow.

Figure 10:
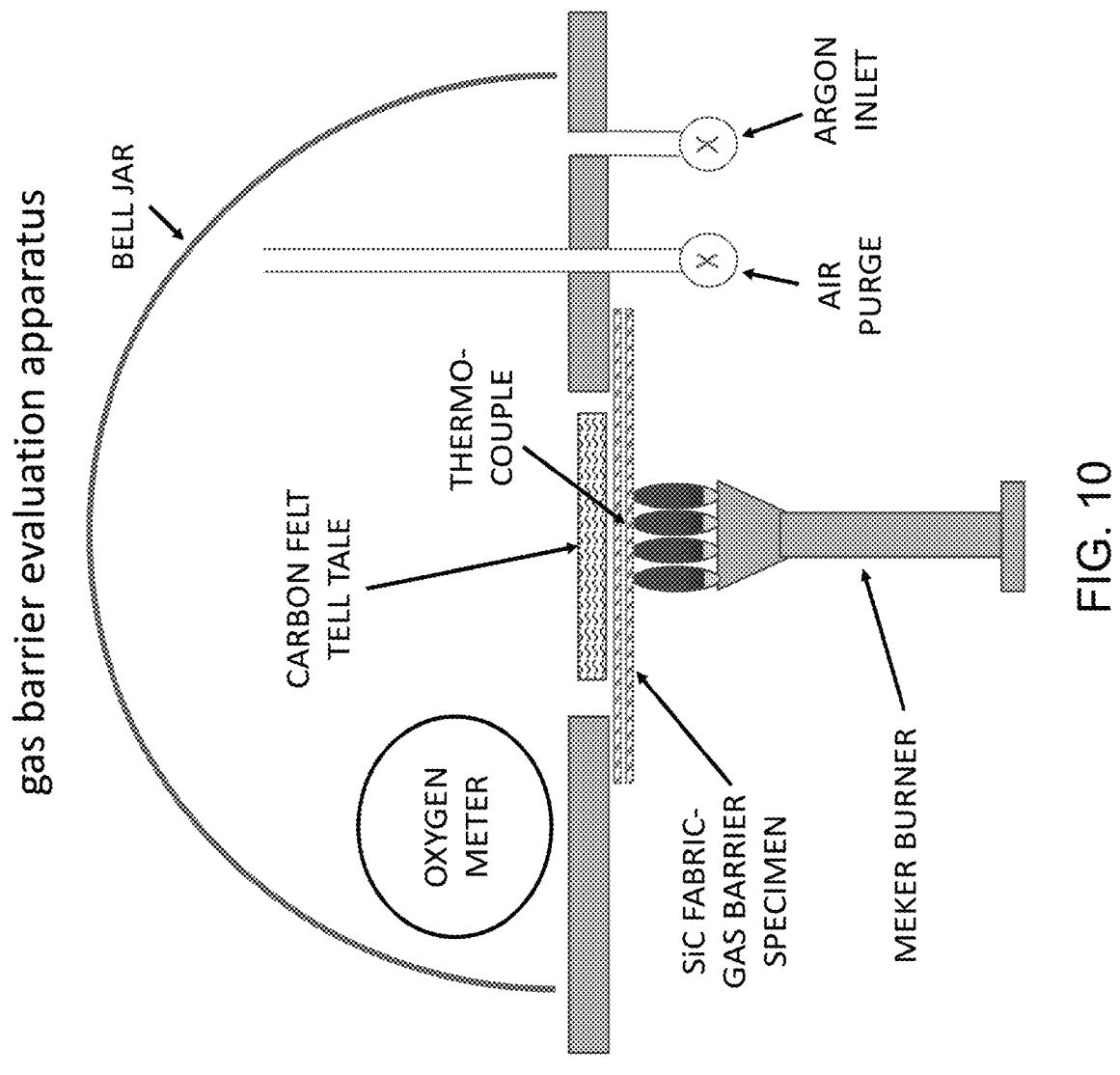
FIG. 10 shows a diagram of a gas barrier evaluation apparatus.

Phase I: The initial task under Phase I will be to develop a test protocol and construct a test apparatus to evaluate gas barrier effectiveness. Having an in-house capability to evaluate FGB candidates will be crucial in Phase II so demonstrating that capability in Phase I is a priority. The test should expose FGB candidates to repeatable heating conditions, and measure the effectiveness of the gas barrier in preventing mass transfer. The initial design for the apparatus is shown in FIG. 10. This apparatus will use a Meker burner to heat the test specimen as described above. However, a bell jar will be added to isolate the atmosphere on the cold side of the sample. During set up, the air will be displaced from the bell jar by Argon. A minimal amount of air will be confirmed with a meter that reads atmospheric oxygen content. Upon heating, the oxygen level would be expected to increase as gas moves through the sample and fills the bell jar. The usefulness of the procedure will be confirmed by testing samples with and without gas barriers to bracket the range of data to be expected. The time to reach different levels of $O_2$ will be observed and recorded to determine how long the test should be conducted with real FBG candidates. If the $O_2$ signal is small because only byproducts of combustion are being transmitted, a $CO_2$ meter will be used instead of an $O_2$ meter. Carbon felt samples will also be exposed, and mass loss measured, to determine if conditions are being achieved that would cause oxidation and recession.

The temperature between the SiC fabric layers, and the temperatures on either side of the FGB will also be measured. It is expected that the phase change condition can be detected when the gas barrier temperature holds constant for a short time as the gas barrier changes from a solid to a liquid. Monitoring changes in $O_2$ and/or $CO_2$ levels after that phase change would be the best indicator if an FGB candidate is performing as designed.

The second task would be to develop five different FGB candidates. The goal for this effort is to develop different FGB designs that will indicate how the effort should move forward in Phase II. The primary gas barrier materials will be selected to undergo phase change at a temperature that is representative of HIAD OML temperatures and achievable with the apparatus. Wetting agents, like brazing fluxes may be added to the FGB candidates to improve flow. Materials, like powders of $Al_2O_3$ and MgO, may be added to increase viscosity. Five alternative FGB candidates will be developed based on systematic variation of ingredients.

The third task in the Phase I effort will be to conduct the tests, and gather and analyze the data. The objective of this task is to demonstrate a correlation between FGB properties and the rate of change of the gas mixture in the bell jar. For example, effective wetting agents should lead to improved sealing, which should yield a slower rate of change in the bell jar. A secondary objective of this task will be to track improvements in the protocol and apparatus that will benefit the Phase II effort.

While the optimized FGB may not be developed in Phase I, it is expected that materials can be identified that work as a gas barrier, and that data will demonstrate either a strong or weak relationship between the amount of those materials and the FGB performance in terms of melt, wetting and viscosity.

Phase II It is anticipated that the following four tasks will be completed in Phase II:

In-house FGB optimization and testing HeetShield will build on lessons learned in Phase I to complete the optimization and testing cycles required to develop a suitable FGB. It is most likely that Phase I will be completed with proof that a gas barrier will reduce mass flow, and progress developing the FGB. Selecting materials that will melt at the right temperatures will likely be demonstrated in Phase I but getting them to have the proper flow and viscosity characteristics may not be completed until Phase II. Developing a FGB with the suitable melt, flow and viscosity characteristics will be completed during this task.

Pilot production FGB run HeetShield will produce a 1.0 meter wide×10 m. long roll of FGB. HeetShield's manufacturing capability should come on-line during the Phase II period of performance so producing a sample roll would be the most appropriate method of confirming scalability of the technology.

Support LCAT testing HeetShield will coordinate with NASA Langley's HIAD technology development team to support testing at the LCAT facility. Support would include providing F-TPS test specimens including optimized FGB candidates, predicting performance prior to the test, analyzing results after the test, analyzing the specimens after the test, and attending the test if desired.

Model heat and mass flow within F-TPS and at OML Most likely through a subcontract to Dr. Matt Berg, who developed the model that calculates radiative heat transfer through fibrous mats from first principles, mass flow will be modeled through F-TPS during a simulated re-entry profile. The model will be used to explain the effects noted above under Concept Validation wherein 1) a larger temperature difference is established and maintained across the gas barrier than would be predicted without mass flow, and 2) the gas barrier reduces the OML temperature compared to the OML temperature in an F-TPS with no gas barrier. To correlate with experimental data, the model would have to include other modes of heat transfer, including solid conduction, gas conduction, and radiation. The model would also have to account for increased radiative heat transfer and heat loss attributable to oxidation/recession of the KFA layers. If the model captures all modes of heat transfer, it should correlate closely with data obtained experimentally at Boeing's LCAT facility.

Phase III FGB samples will be made using the same methods now used to make Opacified Fibrous Insulation (OFI), and FGB will be commercialized using the same infrastructure now being developed by HeetShield. FGB will be a wet laid nonwoven, which means the ingredients are mixed together in a water-based solution, cast onto a screen, and formed like other papers, felts and nonwovens. Small samples are made using TAPPI hand sheet methods. Large quantities could be produced in paper making facilities on a toll manufacturing basis. However, because of the high cost of materials and the large amount of waste associated with traditional paper making equipment, Heet-Shield is already developing an in-house manufacturing capability to produce 1m×10m sheets of OFI and Flexible Insulation with Reinforced Aerogel (FIRA) to support HIAD. By leveraging prior investments to commercialize FIRA and OFI, FGB will more quickly reach a higher Manufacturing Readiness Level (MRL).

3: Phase I Technical Objectives

The overall objective of the Phase I program is to prove that a gas barrier located between the SiC fabric layers can reduce mass flow. Eliminating or reducing mass flow will reduce oxidation/recession of the carbon felt layers and reduce heating throughout the F-TPS. It is anticipated that the FGB materials will liquify upon heating, that capillary action will draw it into the crevices in the fabric weaves to seal those crevices against gas flow, and that surface tension will hold the FGB in place while it remains in a liquid state. Although the weight and bulk of the F-TPS could be increased by adding the FGB, adding a gas barrier is expected to make the F-TPS more effective such that other components can be reduced or eliminated, delivering a net weight and bulk reduction. Test data will be gathered to evaluate our progress, and fabrication/manufacturing issues will be considered to properly assess hurdles to overcome in Phases II and III. This vision is served by the following objectives:

1. Develop an in-house test to evaluate FGB effectiveness, and
2. Develop and test 5 FGB designs to develop a body of data to determine if the concept has merit, and
3. Identify barriers to implementation to overcome in Phase II Prior Work The PI and his team have the experience and equipment to complete the research and the tests anticipated in Phase I. Specialized knowledge related to fabricating FIRA and OFI has been gained on previous efforts (NNX16CL26C, FA9550C18C0003). Experience assembling a flexible TPS for fire shelters was gained supporting Convective Heating Improvement for Emergency Fire Shelters (CHIEFS). Except as noted in the SOW, all work will be performed by HeetShield in Flagstaff, AZ.

Risks The concept of adding a gas barrier to the OML of a TPS is a proven method of minimizing mass transfer within a TPS to improve performance and longevity[ix]. Molten alumina and silica have even been identified as two of the most promising gas barrier materials to protect porous TPSx. The risks are associated with 1. Ensuring that the gas barrier material melts early enough in the re-entry to prevent oxygen from entering, and
2. Determining that the molten gas barrier material wets out the SiC fabric to form a good seal, and
3. Preventing the gas barrier material from being transported away.

Metrics In Phase I, the best metric of success for this proof of concept will be to demonstrate an effective gas barrier using the in-house test method proposed herein. Confirming that performance with a fully developed FGB prototype at the Boeing Large Core Arc Tunnel (LCAT) would be the best measure of success, and that milestone is expected in Phase II.

High Temperature Exposure and Processing The research facility also operates a high-temperature furnace for use in exposing samples to temperatures up to 1700° C. Many materials have a limited life time at such temperatures, and others are useable by themselves but react at high temperatures when combined. It is therefore frequently necessary to expose high temperature insulation materials to temperature profiles simulating their intended use in order to assess stability, degradation and the exposure's impact on thermal and mechanical properties.

The furnace is also used to produce shapes such as honeycomb by processing them at temperatures above their use temperature so that they are stable and strong at their lower, use temperatures. The furnace has a 6×6×6 inch volume heated with MoSi2 elements controlled using a programmable thermostat that maintains heating, soak and cooling rates as needed.

Large Panel Furnace The research facility has a large furnace for processing flat or curved Thermal Protection Systems (TPS) up to 24×24×5 in. in size. This electric furnace has heating elements on five sides including the door to maintain even temperatures throughout the interior. The furnace includes a counter-balanced door that can be opened and closed quickly so it can be loaded or unloaded quickly and safely with minimal heat loss. The temperatures are controlled precisely using a proportional-integral-derivative controller (PID controller) that monitors and maintains temperatures according to the program set by our engineers. The precise control over multiple segments allows us to cure advanced coatings and adhesives that need to be heated and annealed at specific temperatures over specific periods of time to achieve their ultimate properties. The furnace can maintain a maximum temperature of 2400° F.

Thermal Imaging A FLIR infrared camera is available for fault identification and analysis. The camera displays an image wherein temperature differences across a surface are displayed in different colors. This Flir E4 uses Multi-Spectral Dynamic Imaging (MSX) for easier interpretation of an image by detecting the edges of objects and including that detail in the thermal image. Surface emittance is adjustable and temperatures up to 450° F. can be processed automatically. The E4 maintains 2% accuracy and has a 4800 pixel image displayed in a 3 inch color LCD display. Still images can be transferred from the camera for use in reports. This capability is used by our researchers to identify a bad seam, a faulty adhesive bond or a failed heating element.

In addition to the specialized equipment described above for developing and testing thermal insulations and Thermal Protection Systems (TPS), SDMA also has available a 7 Class sewing machine as used for sewing TPS blankets on the Orbiter, additional sewing machines for prototype fabrication, mixing and processing equipment for custom insulation mixes, a vacuum system with an 18 in. bell jar for testing and processing, microscopes for material evaluation, electronic balances, and desk top computers to support documentation of our progress, two industrial sewing machines, a vacuum system, power supplies, and typical office equipment and hand tools.

Figure 12:
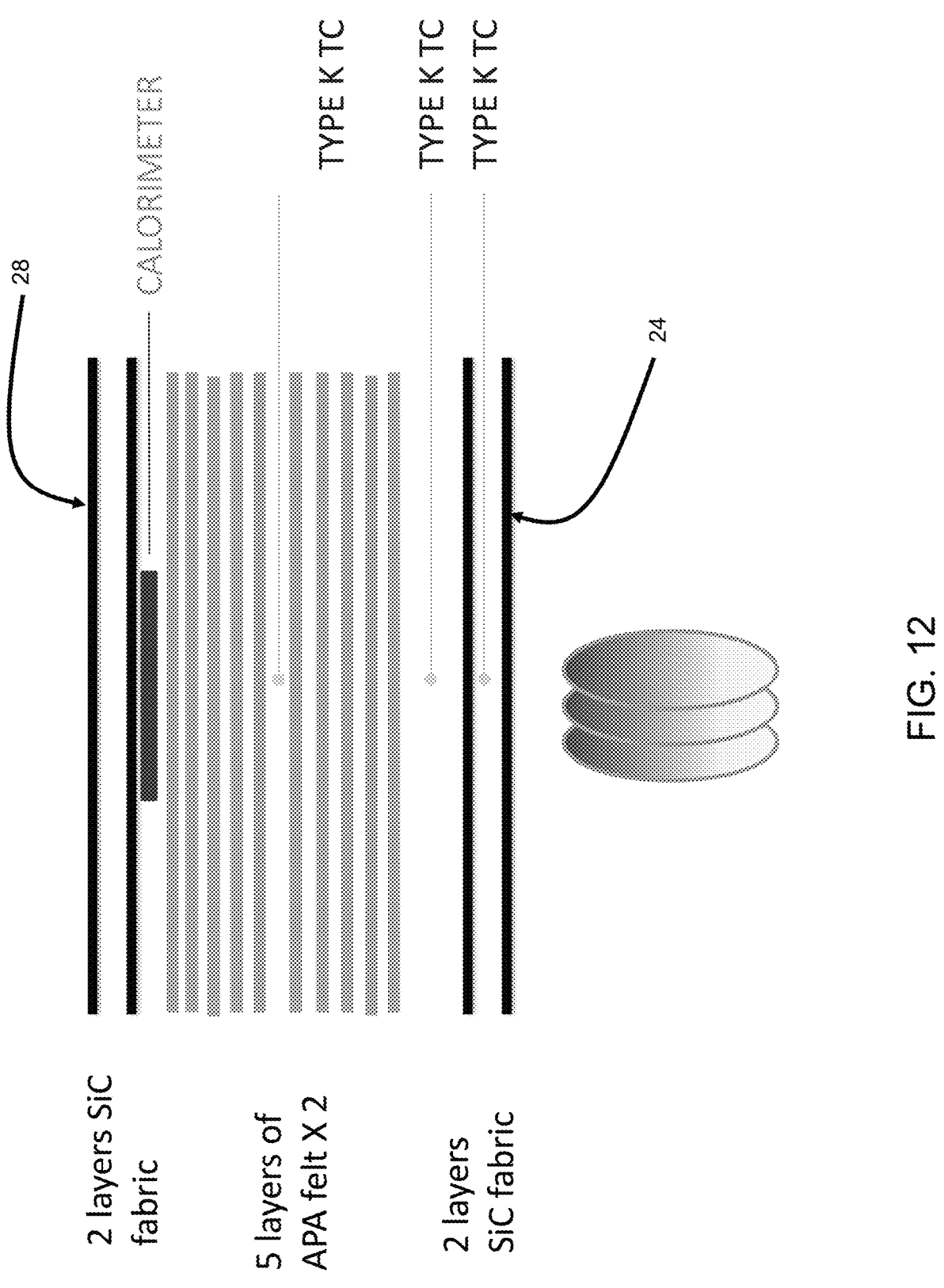
FIG. 12 shows a diagram of a baseline construct for a high temperature insulation material having two layers of SiC configured on an outside surface, and inside surface with five layers of APA felt, a very thin paper material made with alumina fibers.
Figure 13:
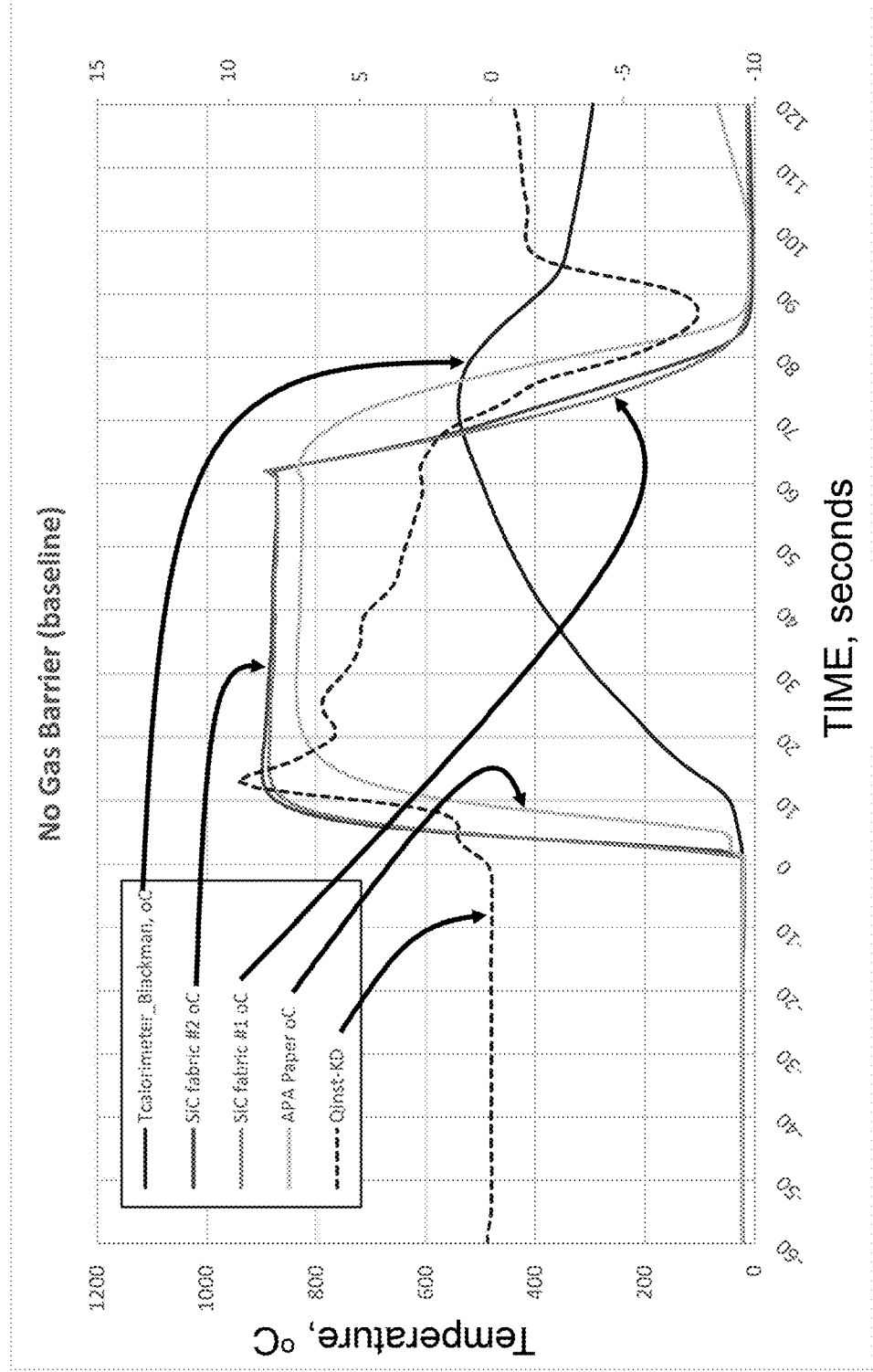
FIG. 13 is a graph of temperature and heat flux versus time for the construct shown in FIG. 12.
Figure 14:
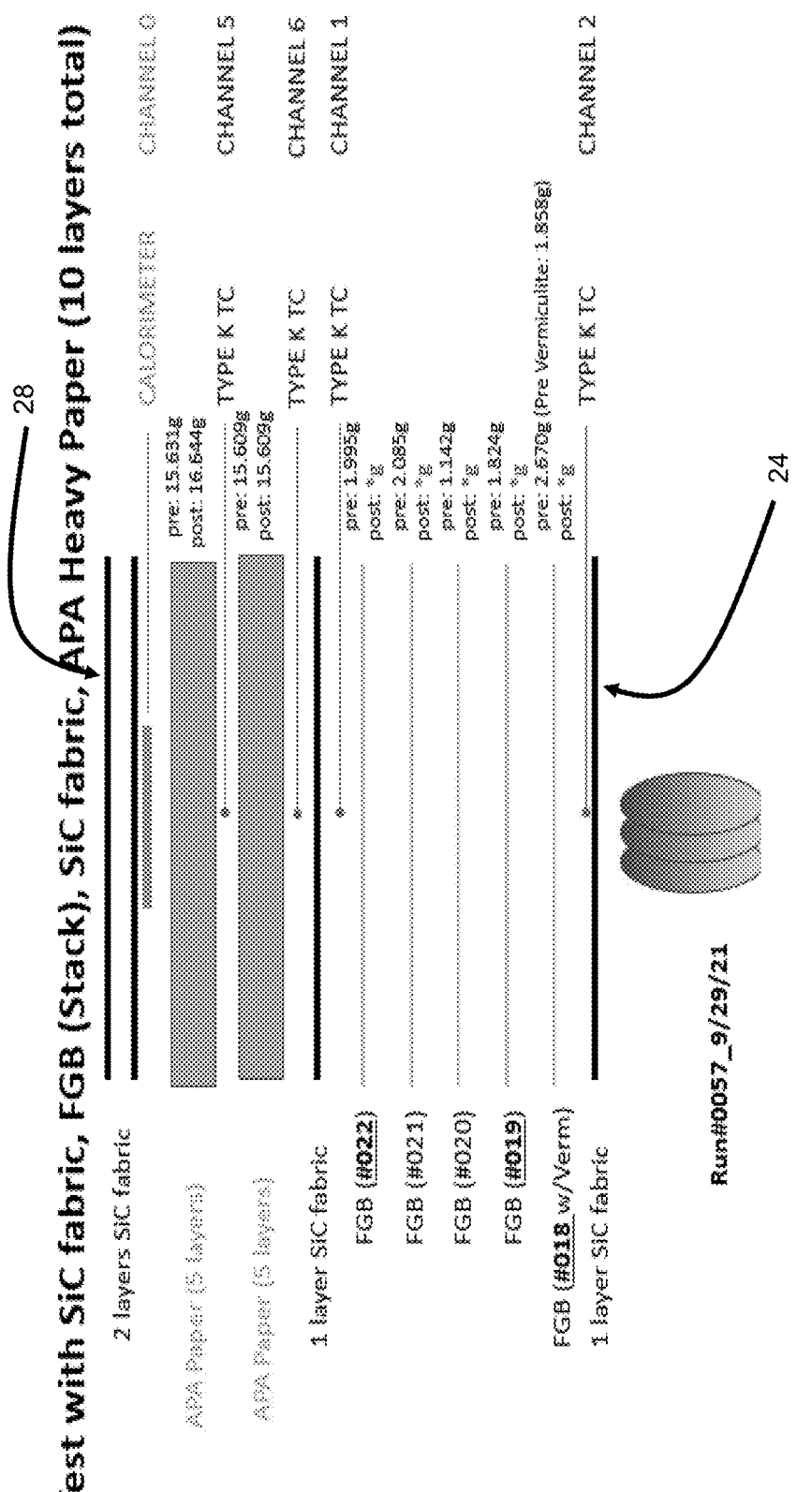
FIG. 14 shows a diagram of an exemplary high temperature flexible insulation construct having two layers of SiC configured on an inside surface with two sets of five layers of APA felt, a very thin paper material made with alumina fibers, and then four layers of flexible gas barrier (FGB) comprising high temperature fibers as a structural component and a binder that may be a nano-fibrillated fiber and frits. An additional FGB layer is configured on the outside surface and has a similar construction to the other FGB layers but also has a vermiculite coating. The frits in each successive layer from the outside surface toward the inside surface had a lower melting temperature.
Figure 15:
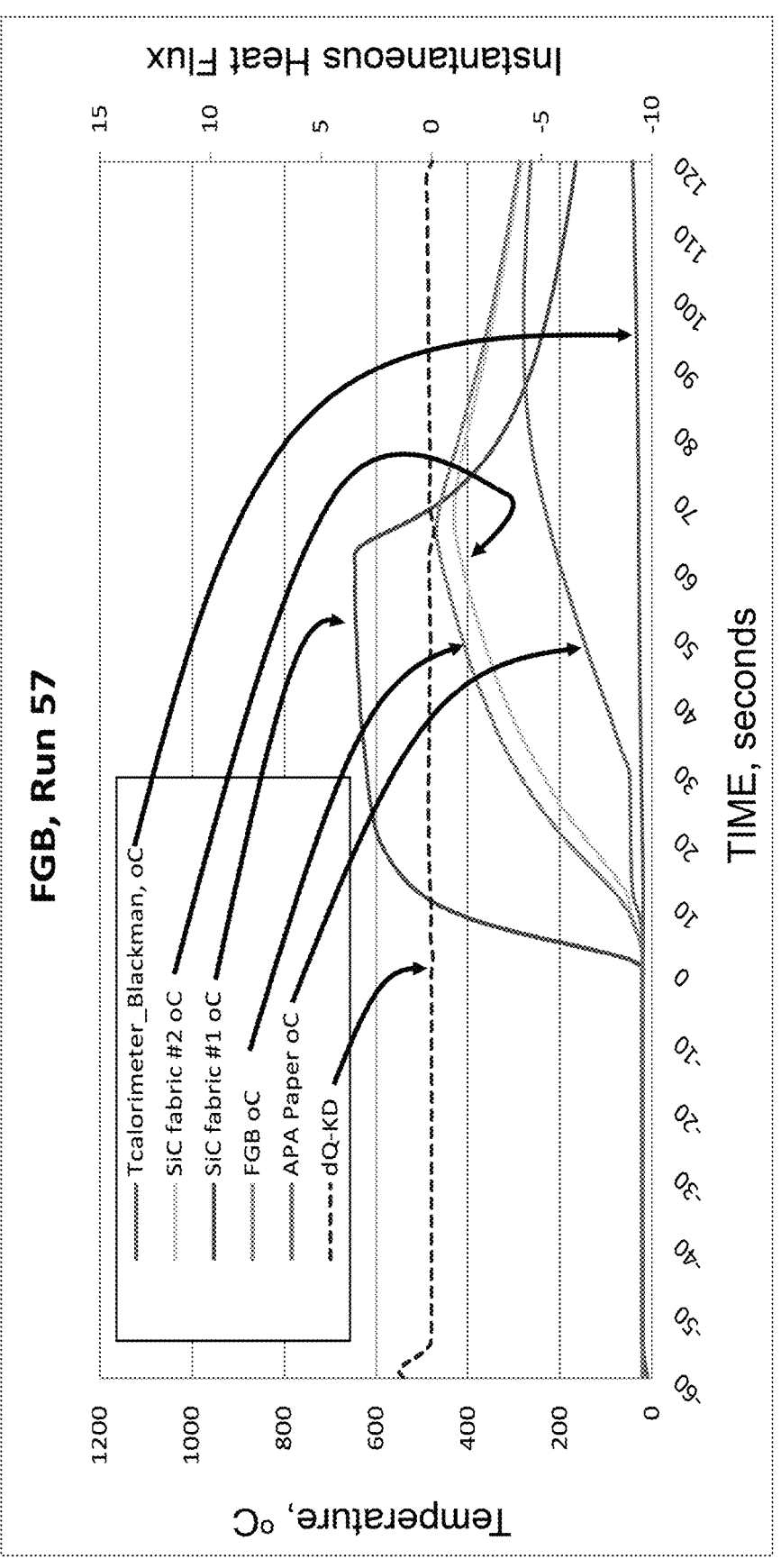
FIG. 15 is a graph of temperature and heat flux versus time for the construct shown in FIG. 14.

Referring now to FIGS. 12 to 15, the flexible gas barrier construct shown in FIG. 14, had superior heat flux management through the thickness of the material from the baseline construct shown in FIG. 12. The heat flux from the outside surface 24 to the inside surface 28 was greatly reduced by the new construct shown in FIG. 14. The dashed line is the overall heat flux through the system as indicated by the Y-axis on the right side of the graphs. The overall heat flux shown in FIG. 15 is dramatically lower than that shown in FIG. 13. The frits melt as they are exposed to higher temperatures and this melting prevents and suppresses the advection to prevent high heat flux. In addition, the flexible gas barrier on the outside surface is coated with vermiculite and this prevents or reduces the initial advection into the construct.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A high temperature flexible insulation comprising a gas barrier system comprising:

a) an outside layer of an insulation mat that is a non-woven, comprising:

i) a structural component comprising high temperature fibers selected from the group consisting of carbon, alumina, silica, mullite, a carbide, a nitride, a boride, and combinations thereof, said high temperature fibers having an average fiber diameter of no more than 25 μm, and a thermal degradation temperature in a non-oxygenated environment of at least 2000° C.;

wherein there are gaps between the high temperature fibers of the structural component;

ii) an extinction component of fibers or particles selected from the group consisting of carbon, alumina, silica, mullite, a carbide, a nitride, a boride, titanium oxide and combinations thereof, having an average size of no more than 25 μm and a thermal degradation temperature in a non-oxygenated environment of at least 2000° C.;

iii) wherein there are gaps between the extinction component;

b) a binder component of a nano-fibrous binder having a length to diameter ratio of at least 10 and an average diameter of no more than 1 μm;

wherein the binder couples together the high temperature fibers of the structural component and wherein the binder couples together the structural component to the extinction component;

c) frits comprising a mixture of mineral and fluxes that are particles coupled to the structural component by said binder;

wherein the high temperature flexible insulation contains the frits in a concentration by weight of the high temperature flexible insulation of at least 10%;

wherein the frits in the outside layer melt at a first temperature, and flow to fill in said gaps between the high temperature fibers of the structural component and gaps between the extinction component to prevent advection through the high temperature flexible insulation;

wherein the frits are configured through a thickness of the high temperature flexible insulation with decreasing melting temperature from an outside surface to an inside surface; and wherein the high temperature flexible insulation is durably flexible, wherein it can be folded over upon itself and creased by hand three times without tearing.

2. The high temperature flexible insulation of claim 1, wherein the outside layer comprises a vermiculite coating.

3. The high temperature flexible insulation of claim 1, further comprising d) an inside layer of an insulation mat, comprising:

i) a structural component of high temperature fibers selected from the group consisting of carbon, alumina, silica, mullite, a carbide, a nitride, a boride, and combinations thereof, said high temperature fibers having an average fiber diameter of no more than 25 μm, and a thermal degradation temperature in a non-oxygenated environment of at least 2000° C.;

ii) an extinction component selected from the group consisting of carbon, alumina, silica, mullite, a carbide, a nitride, a boride, titanium oxide and combinations thereof, having an average size of no more than 25 μm and a thermal degradation temperature in a non-oxygenated environment of at least 2000° C.; and iii) a binder component of a nano-fibrous binder having a length to diameter ratio of at least 10 and an average diameter of no more than 1 μm;

iv) frits coupled to the structural component of the inside layer and said frits comprise a mixture of mineral and fluxes:

wherein the frits in the inside layer are configured to melt at a second temperature, and flow to fill in said gaps to prevent advection through the high temperature flexible insulation; and wherein the second temperature is at least 5° C. different than the first temperature.

4. The high temperature flexible insulation of claim 3, wherein the second temperature is at least 25° C. different than the first temperature.

5. The high temperature flexible insulation of claim 1, further comprising a fabric layer configured on an outside surface of the high temperature flexible insulation.

6. The high temperature flexible insulation of claim 5, wherein the fabric layer comprises frits coupled thereon.

7. The high temperature flexible insulation of claim 6, wherein the fabric layer comprises silicon carbide.

8. The high temperature flexible insulation of claim 1, wherein the extinction component is a high temperature fiber having an average fiber diameter of no more than 10 μm.

9. The high temperature flexible insulation of claim 1, wherein the extinction component is a high temperature fiber having an average fiber diameter of no more than 3 μm.

10. The high temperature flexible insulation of claim 1, wherein the extinction component is a particle.

11. The high temperature flexible insulation of claim 10, wherein the extinction component is a particle having an average particle size of no more than 10 μm.

12. The high temperature flexible insulation of claim 10, wherein the extinction component is a powder of titanium oxide.

13. The high temperature flexible insulation of claim 1, wherein the extinction component is silicon carbide.

14. The high temperature flexible insulation of claim 1, wherein the average diameter of the high temperature fibers of the structural component is no more than 5 μm.

15. The high temperature flexible insulation of claim 1, wherein the high temperature fibers of the structural component are alumina.

* * * * *